United States Patent [19]

Acker

[11] Patent Number: 5,752,712
[45] Date of Patent: May 19, 1998

[54] GAS BAG MODULE FOR A VEHICLE

[75] Inventor: Dominique Acker, Alfdorf, Germany

[73] Assignee: TRW Occupant Restraint Systems GmbH, Alfdorf, Germany

[21] Appl. No.: 824,227

[22] Filed: Mar. 25, 1997

[30] Foreign Application Priority Data

Apr. 15, 1996 [DE] Germany ............... 296 06 724 U

[51] Int. Cl.[6] ............................................. B60R 21/20
[52] U.S. Cl. ................................. 280/728.2; 280/732
[58] Field of Search ......................... 280/728.2, 732, 280/728.1, 736

[56] References Cited

U.S. PATENT DOCUMENTS

| | | | |
|---|---|---|---|
| 5,558,362 | 9/1996 | Acker et al. | 280/728.2 |
| 5,611,563 | 3/1997 | Olson et al. | 280/728.2 |
| 5,639,111 | 6/1997 | Spencer et al. | 280/728.2 |
| 5,690,354 | 11/1997 | Logan et al. | 280/728.2 |

FOREIGN PATENT DOCUMENTS 5286401   11/1993   Japan .

*Primary Examiner*—Christopher P. Ellis
*Attorney, Agent, or Firm*—Tarolli, Sundheim, Covell, Tummino & Szabo

[57] ABSTRACT

A gas bag module for a vehicle is provided, comprising an elongated attachment strip having two axial ends. The attachment strip is provided with a through-flow port at one of the axial ends and with two clip-type clamping sections. A first one of said clamping sections is located in the region of said through-flow port. The gas bag module further comprises a generally tubular pressurized gas source provided with several discharge ports for pressurized gas in its outer surface at one axial end. The pressurized gas source is clamped to the attachment strip by means of the clamping sections in such a way that one of the discharge ports is located opposite the through-flow port, the remaining of the discharge ports being sealed by the first clip-type clamping section. The gas bag module further comprises a folded gas bag which is in fluid-communication with the pressurized gas source via the through-flow port and which can be unfolded by the pressurized gas. Still further, the gas bag module comprises an elongated attachment frame which is located in the interior of the gas bag and which is connected to the attachment strip.

6 Claims, 3 Drawing Sheets

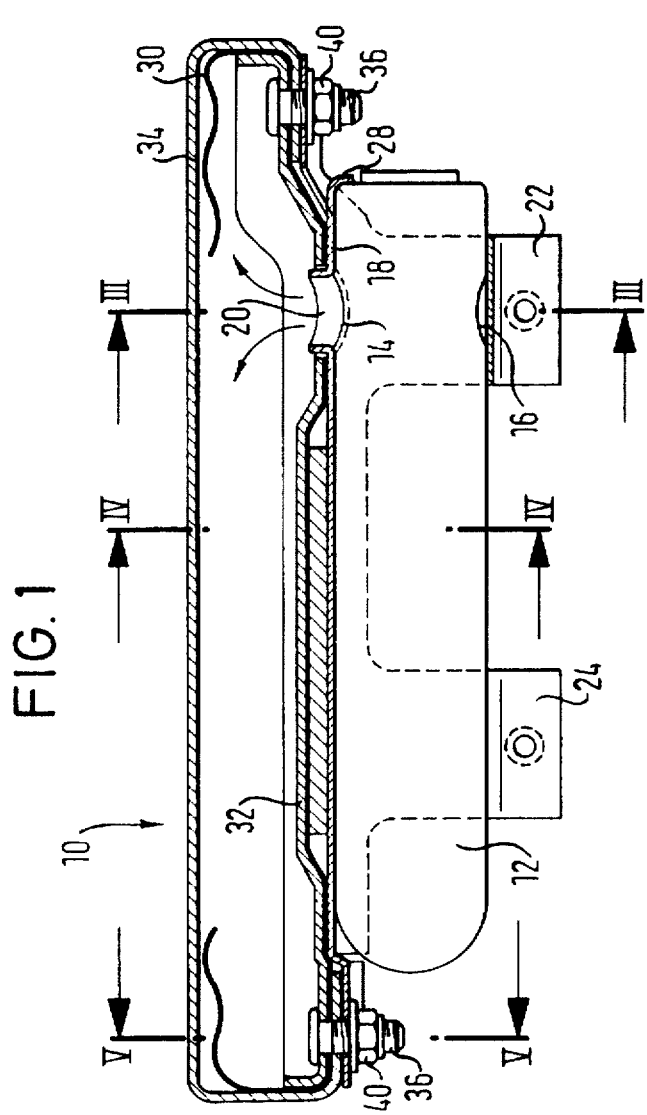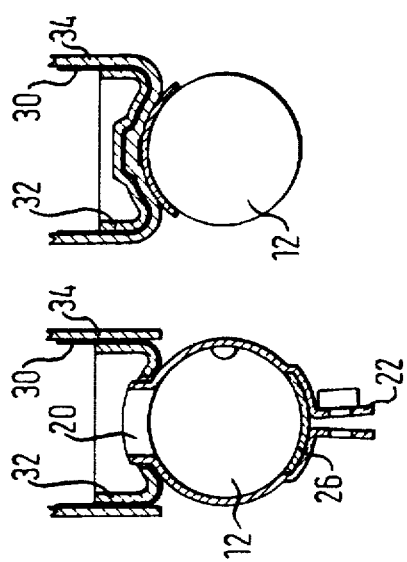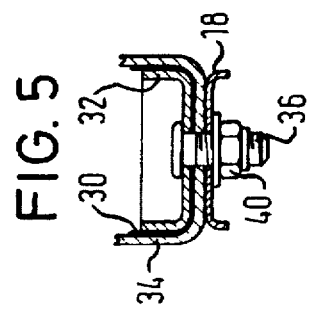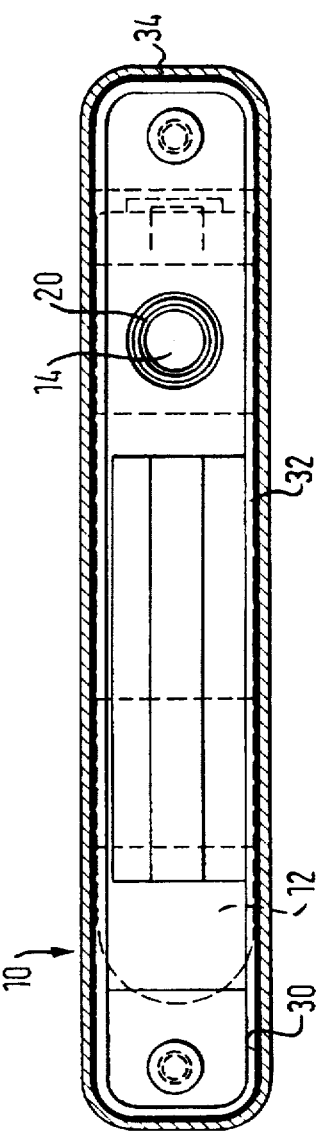

GAS BAG MODULE FOR A VEHICLE

BACKGROUND OF THE INVENTION

A gas bag module for a vehicle generally consists of a pressurized gas source and a gas bag which is in fluid communication with the former. When a suitable triggering sensor device determines that activation of the gas bag module has to take place because of the occurring vehicle retardation, the pressurized gas is released from the pressurized gas source, causing the gas bag to unfold in such a way that it can provide a protective function for a vehicle occupant. Generally, tubular gas generators which are fitted with several discharge ports in the region of one axial end are increasingly being used as pressurized gas sources. Preferably, two diametrically opposed discharge ports are used, through which the pressurized gas can flow after the pressurized gas source has been activated. Such generators usually have a diameter of approximately 30 mm; depending on the output required for the application in question, different lengths of pressurized gas source are used. To guide the pressurized gas from the discharge ports into the gas bag, guideways surrounding the body of the gas generator are required at a radial distance. The over-all width of the gas bag module is determined by these guideways.

BRIEF SUMMARY OF THE INVENTION

The invention provides a reasonably-priced and particularly compact gas bag module whose width is hardly greater than the diameter of the body of the gas generator. According to the invention, a gas bag module for a vehicle is provided, comprising an elongated attachment strip having two axial ends. The attachment strip is provided with a through-flow port at one of the axial ends and with two clip-type clamping sections. A first one of said clamping sections is located in the region of said through-flow port. The gas bag module further comprises a generally tubular pressurized gas source provided with several discharge ports for pressurized gas in its outer surface at one axial end. The pressurized gas source is clamped to the attachment strip by means of the clamping sections in such a way that one of the discharge ports is located opposite the through-flow port, the remaining of the discharge ports being sealed by the first clip-type clamping section. The gas bag module further comprises a folded gas bag which is in fluid-communication with the pressurized gas source via the through-flow port and which can be unfolded by the pressurized gas. Still further, the gas bag module comprises an elongated attachment frame which is located in the interior of the gas bag and which is connected to the attachment strip. Such a gas bag module is distinguished by particularly good economy of space. The maximum width of the module is essentially determined by the diameter of the pressurized gas source plus the double wall thickness of the material of the clamping sections. The particularly compact design is possible due to the perception that not all discharge ports of the pressurized gas source are necessary for the correct unfolding of the gas bag, but that sufficiently rapid deployment can also be achieved with one single discharge port which is turned directly towards the gas bag, thus ensuring low flow losses. The gas bag module in accordance with the invention can be adapted particularly easily to pressurized gas sources of different outputs, since both long and short pressurized gas sources can be reliably clamped in the clamping sections.

Advantageous embodiments of the invention are given in the subclaims.

BRIEF DESCRIPTION OF THE DRAWINGS

The invention is described in the following, reference being made to one preferred embodiment which is illustrated in the drawing. In this drawing:

FIG. 1 shows a schematic, partially cutaway side view of a gas bag module in accordance with the invention;

FIG. 2 shows a schematic top view of the gas bag module shown in FIG. 1;

FIG. 3 shows a section along the line III—III of FIG. 1;

FIG. 4 shows a section along the line IV—IV of FIG. 1;

FIG. 5 shows a section along the line V—V of FIG. 1;

DETAILED DESCRIPTION OF THE INVENTION

Figure 6:
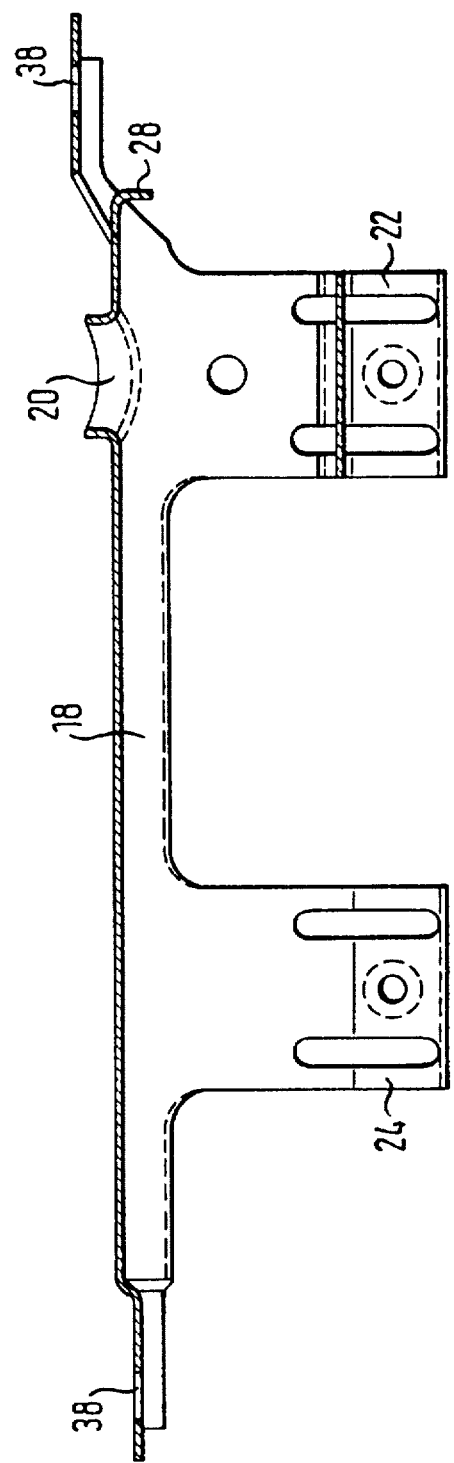
FIG. 6 shows a schematic side view of an attachment strip used in the gas bag of FIG. 1.
Figure 7:
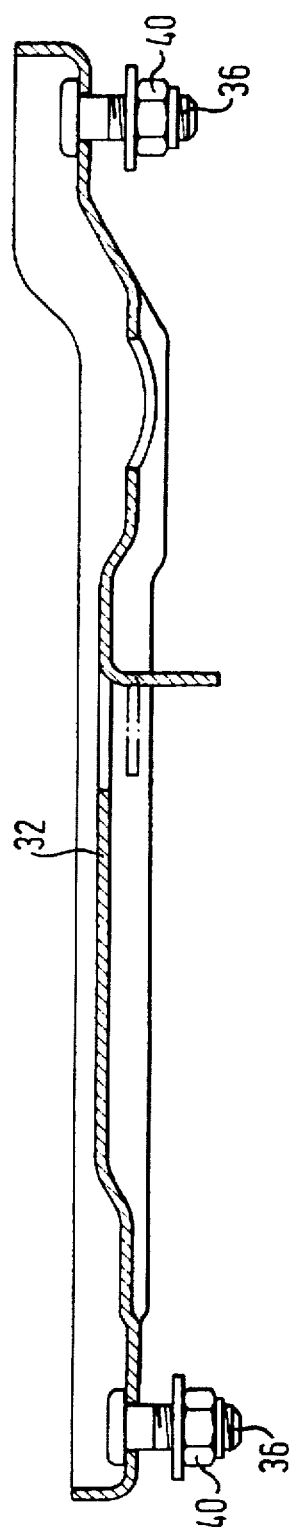
FIG. 7 shows a schematic side view of an attachment frame used in the gas bag module of FIG. 1.

A preferred embodiment of a gas bag module 10 for a vehicle in accordance with the invention is shown in FIGS. 1 to 7. The gas bag module 10 contains a generally tubular pressurized gas source 12 which at one axial end has two discharge ports 14 and 16 which are located in the outer surface of the pressurized gas source 12. The pressurized gas source 12 is attached to an elongated attachment strip 18, which at one axial end has a through-flow port 20, which is encompassed by a cylindrical extension. For attachment of the pressurized gas source 12, the attachment strip 18 has two clip-type clamping sections 22, 24, of which one, that is, clamping section 22, is located in the region of the through-flow port 20, while the other clamping section 24 is located nearer to the other axial end of the attachment strip 18. In the region of the clamping gap, the clamping section 22 also has a cover plate 26. The pressurized gas source 12 is clamped in the two clip-type clamping sections 22, 24 in such a way that the discharge port 14 is located opposite the through-flow port 20, while the discharge port 16 is sealed by the cover plate 26. To facilitate the installation of the pressurized gas source 12, a stop plate 28 is located on the attachment strip 18, in order to form an axial stop for the pressurized gas source 12. The attachment strip 18 together with the pressurized gas source 12 attached to it form a first preassembled unit.

A second preassembled unit consisting of a gas bag 30, an elongated attachment frame 32 which is located in the interior of the gas bag, and a gas bag cover 34 is connected to this first unit. The attachment frame which is located in the interior of the gas bag 30, has an opening complementary to the cylindrical extension on the attachment strip and is fitted with bolts 36, which are attached to the attachment frame 32 and pass through retaining openings in the gas bag 30. The gas bag 30 is folded together on the attachment frame 32 in such a way that the width of the second unit substantially corresponds to the width of the first unit. The gas bag cover 34, which is fitted with fixing openings through which the bolts 36 also pass, is placed on top of the folded gas bag. The gas bag 30, the attachment frame 32 and the gas bag cover 34 are thus attached to each other by the bolts 36 as the second preassembled unit.

The two units are connected to each other by placing the second unit on the first unit in such a way that the bolts 36 are inserted through assigned openings 38 of the attachment strip 18. The engagement of the cylindrical extension of the attachment strip in the complementary opening of the attachment frame supports the fixation of the two units relatively to each other. Suitable mounting brackets (not illustrated), with which the gas bag module 10 can be fastened to the vehicle, can then be placed on the bolts 36. Finally, suitable nuts 40 are screwed onto the bolts 36 to connect the first unit firmly with the second unit and to secure the gas bag cover 34 and the gas bag 30 (and possibly also the mounting brackets) by means of a clamping effect between the attachment frame 32 and the attachment strip 18.

The gas bag module in accordance with the invention functions as follows: When the pressurized gas source is activated by a triggering sensor device (not illustrated), the pressurized gas contained in the pressurized gas source 12 only flows out of the discharge port 14, since the discharge port 16 is sealed by the cover plate 26. The gas bag 30 is inflated and deployed, whereby the gas bag cover 34 is torn open at the beginning of the deployment process.

The design in accordance with the invention leads to the following advantages: the gas bag module in accordance with the invention is particularly compact, since the width of the module in general does not exceed the diameter of the pressurized gas source 12 plus the double wall thickness of the clamping sections. The gas bag module can easily be adapted to pressurized gas sources with different outputs, since pressurized gas sources of practically any length can be inserted without the attachment strip 18 having to be modified. The gas bag module can consist of two preassembled units, which results in particular flexibility during installation. Through the mounting brackets, which can be mounted on the bolts very simply, the gas bag module in accordance with the invention can in each case be adapted particularly easily to the installation conditions in the desired vehicle. Due to reducing the material expanditure for the attachment strip 18 to the structurally necessary minimum, that is, an elongated strip and two clip-type clamping sections, the gas bag module in accordance with the invention has a particularly low weight. Furthermore, very great flexibility results with regard to the usable gas bags and gas bag covers, which are secured particularly simply using a clamping effect between the attachment frame 32 and the attachment strip 18. Finally, the gas bag module in accordance with the invention is easy to dismantle, which offers advantages in the event of the possible recycling of individual component parts.

I claim:

1. A gas bag module for a vehicle, comprising an elongated attachment strip having two axial ends, said attachment strip being provided with a through-flow port at one of said axial ends and with two clip-type clamping sections, a first one of said clamping sections being located in the region of said through-flow port, and further comprising a generally tubular pressurized gas source provided with several discharge ports for pressurized gas in its outer surface at one axial end, said pressurized gas source being clamped to said attachment strip by means of said clamping sections in such a way that one of said discharge ports is located opposite said through-flow port, the remaining of said discharge ports being sealed by said first clip-type clamping section, a folded gas bag which is in fluid-communication with said pressurized gas source via said through-flow port and which can be unfolded by said pressurized gas, and an elongated attachment frame which is located in the interior of said gas bag and which is connected to said attachment strip.

2. The gas bag module of claim 1, wherein said attachment frame and said folded gas bag form a preassembled unit.

3. The gas bag module of claim 1, wherein said pressurized gas source and said attachment strip form a preassembled unit.

4. The gas bag module of claim 1, wherein said attachment frame is connected to said attachment strip by means of bolts which are secured on said attachment frame and pass through retaining openings provided at said gas bag, and wherein said gas bag is secured between said attachment strip and said attachment frame.

5. The gas bag module of claim 1, wherein a gas bag cover is provided, said gas bag cover being provided with fixing openings through which said bolts extend.

6. The gas bag module of claim 1, wherein mounting brackets are placed on said bolts, said mouting brackets serving for fastening said gas bag module.

* * * * *